United States Patent
MacKenzie et al.

(10) Patent No.: US 11,349,607 B2
(45) Date of Patent: May 31, 2022

(54) CELLULAR TELECOMMUNICATIONS NETWORK

(71) Applicant: BRITISH TELECOMMUNICATIONS PUBLIC LIMITED COMPANY, London (GB)

(72) Inventors: Richard MacKenzie, London (GB); Farhad Mehran, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/248,536

(22) Filed: Jan. 28, 2021

(65) Prior Publication Data

US 2021/0273747 A1   Sep. 2, 2021

(30) Foreign Application Priority Data

Feb. 28, 2020   (EP) .................................... 20160023
Feb. 28, 2020   (GB) .................................... 2002840

(51) Int. Cl.
*H04L 1/00*   (2006.01)
*H04W 92/20*   (2009.01)

(52) U.S. Cl.
CPC ........... *H04L 1/0078* (2013.01); *H04W 92/20* (2013.01)

(58) Field of Classification Search
CPC .. H04L 27/3405; H04L 27/366; H04W 56/00; H04W 56/15
See application file for complete search history.

(56) References Cited

U.S. PATENT DOCUMENTS

| | | | |
|---|---|---|---|
| 8,442,149 B2 | 5/2013 | Humphrey | |
| 8,823,561 B1 | 9/2014 | Hammer et al. | |
| 2016/0373283 A1 | 12/2016 | Zeng et al. | |
| 2017/0265104 A1 | 9/2017 | Arslan et al. | |
| 2018/0124762 A1 | 5/2018 | Zeng et al. | |
| 2019/0312664 A1 | 10/2019 | Klautau et al. | |

FOREIGN PATENT DOCUMENTS

| | | |
|---|---|---|
| WO | WO-2015049013 A1 | 4/2015 |
| WO | WO-2019027711 A1 | 2/2019 |
| WO | WO-2019051869 A1 | 3/2019 |
| WO | WO-2019154507 A1 | 8/2019 |

OTHER PUBLICATIONS

3GPP TR 38.801 V2.0.0 "3rd Generation Partnership Project; Technical Specification Group Radio Access Network; Study on New Radio Access Technology: Radio Access Architecture and Interfaces (Release 14)," 2017, pp. 1-90.

(Continued)

*Primary Examiner* — Abdelillah Elmejjarmi
(74) *Attorney, Agent, or Firm* — Patterson Thuente IP

(57) ABSTRACT

A method of operating a first base station unit to process In-Phase and Quadrature (IQ) data for transmission to a second base station unit, the first and second base station units both being part of a disaggregated base station in a cellular telecommunications network and a method of operating a second base station unit to process a first and second data package processed by a first base station, the method including combining the first and second data packages.

16 Claims, 7 Drawing Sheets

(56) References Cited

OTHER PUBLICATIONS

A. Sun et al., "XRAN Fronthaul Working Group Control, User and Synchronization Plane Specification," 2018, XP0556021, Retrieved from the internet: https://rod-stuhlmuller-nydh.squarespace.com/s/20180405-XRAN-FHCUS0-v0100.pdf, 61 Pages.
Combined Search and Examination Report under Section 17 and 18(3) for GB Application No. 1908303.9, dated Nov. 7, 2019, 7 pages.
Dotsch U., et al., "Quantitative Analysis of Split Base Station Processing and Determination of Advantageous Architectures for LTE," 2013, Bell labs Technical Journal vol. 18 No. (1), 24 pages.
Extended European Search Report for Application No. 19179353.8, dated Nov. 20, 2019, 10 pages.
Extended European Search Report for Application No. 20215151.0, dated Mar. 10, 2021, 7 pages.
Extended European Search Report for EP Application No. 20160023.6 dated Sep. 14, 2020, 7 pages.
International Preliminary Report on Patentability for Application No. PCT/EP2020/062657, dated Apr. 26, 2021, 12 pages.
International Search Report and Written Opinion for Application No. PCT/EP2020/062656, dated Jul. 17, 2020, 14 pages.
NGMN, "NGMN Overview on 5G RAN Functional Decomposition," NGMN Alliance, Version. 1.0, Feb. 2018, 48 pages.
Office Action For Japanese Application No. 2021-001549, dated Apr. 13, 2021, 4 pages.
Office Action For Korean Application No. 10-2021-0002001, dated May 10, 2021, 2 pages.
Ranaweera C. et al., "5G C-RAN Architecture: A Comparison Of Multiple Optical Fronthaul Networks," 2017, International Cvonference On Optical Networks Design and Modeling (ONDM), IFIP, May 15, 2017 (May 15, 2017), XP033107942,(retrieved on Jun. 23, 2017) *chapter III, A* pp. 1-6.

CELLULAR TELECOMMUNICATIONS NETWORK

RELATED APPLICATION

The present application claims priority to EP Application No. 20160023.6 filed Feb. 28, 2020, and GB Application No. 2002840.3, filed Feb. 28, 2020, each which is hereby incorporated herein in its entirety by reference.

TECHNICAL FIELD

The present disclosure relates to a cellular telecommunications network.

BACKGROUND

A cellular telecommunications network may comprise a core network, a radio access network and a plurality of User Equipment (UE). Each UE may access the core network (and any onward connection from the core network such as to the Internet) via the radio access network. A base station is an example of a radio access network node. The base station implements several functions known as baseband processing. In an example, baseband processing includes the PHYsical-layer (PHY) layer functions, Medium Access Control (MAC) layer functions, Radio Link Control (RLC) layer functions, Packet Data Convergence Protocol (PDCP) layer functions, and Radio Resource Control (RRC) layer functions.

In modern cellular telecommunications networks implementing a Centralized Radio Access Network (C-RAN), base station functionality may be divided into several units (either physically if implemented in hardware, or logically if implemented in a software defined network). These are known as "disaggregated" base stations. In a two unit example of a C-RAN, the disaggregated base station is divided into a Central Unit (CU) and a Distributed Unit (DU), although other terminology (such as BaseBand Unit (BBU) and Remote Radio Unit (RRU)) may be used. The CU and DU are connected by a fronthaul link, which may be a wireless or wired (typically optical fiber) connection. The DU implements at least a set of Radio Frequency (RF) functions (e.g. analog to digital and digital to analog conversion) and optionally one or more baseband processing functions. The remainder of the baseband processing functions are implemented in the CU.

In a three unit example of a C-RAN, the disaggregated base station is divided into a CU, DU and a Radio Unit (RU). The CU and DU are connected by a "midhaul" link, which may again be a wireless or wired (typically optical fiber) connection, and the DU and RU are connected by the fronthaul link. In this implementation, the RU implements the RF functions and optionally one or more baseband processing functions (e.g. lower-PHY), the DU implements some of the baseband functions (e.g. higher-PHY, MAC and RLC), and the CU implements all remaining functions (e.g. PDCP and RRC).

The split of functions between the CU and DU (and optionally, RU) is known as the "functional split". In several functional splits, such as the intra-PHY layer split or the RF-PHY layer split, communications between the base station units (e.g. between the CU and DU or between the DU and RU) utilize In-Phase and Quadrature (IQ) data. For the intra-PHY layer split, the base station units communicate using frequency-domain IQ data whereas, for the RF-PHY layer split, the base station units communicate using time-domain IQ data.

Each IQ sample in a frequency-domain IQ data stream represents a constellation point of a modulation scheme. ORAN Fronthaul Working Group Technical Specification "Control, User and Synchronization Plane Specification" v02.00 specifies (in Annex D) various frequency-domain IQ sample structures in which the number of bits used in each frequency-domain IQ sample varies. The number of bits in a frequency-domain IQ sample is known as the "bit width" and may be in a range of 6 to 16 bits (inclusive). These different frequency-domain IQ sample bit widths are achievable using different compression techniques. A compression technique having a relatively higher compression ratio results in relatively fewer bits per sample (i.e. lower bit width), whereas a compression technique having a relatively lower compression ratio results in relatively more bits per sample (i.e. higher bit width). Annex A of the above ORAN specification defines different compression techniques that may be used. Compression techniques resulting in lower bit width frequency-domain IQ samples reduce capacity utilization of the fronthaul link for a given frequency-domain IQ data stream, and therefore enable higher data throughput. However, as these compression techniques are lossy (i.e. they are not lossless), they also reduce the accuracy of the frequency-domain IQ data stream.

Each IQ sample in a time-domain IQ data stream represents a time sample for a single antenna for a single radio carrier. CPRI specification V7.0 describes sample widths and formats which can allow for time-domain IQ sample bit width ranges between 8 to 20 bits (inclusive) in the downlink and 4 and 20 bits (inclusive) in the uplink. Alcatel-Lucent conference paper, "CPRI compression transport for LTE and LTE-A signal to C-RAN" discloses an example compression technique that may be used to achieve these different time-domain IQ sample bit widths.

The accuracy of an IQ data stream can be measured as a reduction in Error Vector Magnitude (EVM) in the downlink or a reduction in Signal to Interference-plus-Noise Ratio (SINR) in the uplink. The average amplitude of the error vectors for an IQ data stream, normalized to peak signal amplitude, is the EVM. 3GPP Technical Specification 36.104 "Evolved Universal Terrestrial Radio Access (E-UTRA); Base Station (BS) radio transmission and reception" defines, in section 6.5.2, several EVM requirements for E-UTRA carriers as:

TABLE 1

EVM Requirements for E-UTRA Carrier

| Modulation and Coding Scheme | Required Maximum EVM [%] |
| --- | --- |
| QPSK | 17.5% |
| 16QAM | 12.5% |
| 64QAM | 8% |
| 256QAM | 3.5% |
| 1024QAM | 2.5% |

Table 1 illustrates that higher order Modulation and Coding Schemes (MCS) require improved EVM performance and that there is a maximum EVM requirement for each MCS. The base station units must therefore select a suitable combination of MCS and compression technique so that the EVM of communications are within the maximum EVM requirement. If the EVM increases, then the base station units may respond by either changing the compression technique to one that uses a greater bit width, or changing the MCS to one with a greater maximum EVM requirement. A response to increase the bit width results in an increase of capacity utilization of the fronthaul link for a given IQ data stream (and therefore a reduction in the achievable data throughput). A response to changing the MCS to one with a greater maximum EVM requirement limits spectral efficiency and therefore reduces the overall radio link capacity (which may be realized by reduced capacity in the fronthaul or in another part of the overall radio link).

SUMMARY

According to a first aspect of the invention, there is provided a method of operating a first base station unit to process In-Phase and Quadrature (IQ) data for transmission to a second base station unit, the first and second base station units both being part of a disaggregated base station in a cellular telecommunications network, the method comprising: preparing a first data package, based on IQ data, for transmission to the second base station unit; determining a first error value between the IQ data and the first data package; causing transmission of the first data package to the second base station unit; determining that the first error value exceeds a first error threshold; and, in response to the determination that the first error value exceeds the first error threshold: preparing a second data package, based on the IQ data, for transmission to the second base station unit, wherein a second error value between the IQ data and a combination of the first and second data packages is less than the first error value, and causing transmission of the second data package to the second base station unit.

The first and second base station units may be connectable by a first communications link and a second communications link, the step of causing transmission of the first data package may be over the first communications link and the step of causing transmission of the second data package may be over the second communications link.

The first and second communications links may be based on separate connections between the first and second base station units. The first and second communications links may be logical and may be based on the same connection between the first and second base station units.

A set of resources of the first or second communications link may be shared between a plurality of network operators.

The method may further comprise determining whether the first or second communications link should be used for transmission of the first data package. The determination of whether the first or second communications link should be used for transmission of the first data package may be based on a comparison of one or more performance metrics for the first and second communications links.

The first and second data packages may be compressed and the method may further comprise the step of determining a compression ratio for the second data package so that the second error value is less than a second error threshold. The second error threshold may be less than or equal to the first error threshold.

The disaggregated base station may include at least one central base station unit and at least one distributed base station unit, wherein the first base station unit is either one of the central base station units or one of the distributed base station units; at least one central base station unit, at least one distributed base station unit, and at least one radio base station unit, wherein the first base station unit is either one of the distributed base station units or one of the radio base station units; or at least one central base station unit, at least one distributed base station unit, at least one FrontHaul GateWay, FHGW, and at least one radio base station unit, wherein the first base station unit is either one of the distributed base station units or one of the radio base station units.

A cellular telecommunications protocol split between the first and second base station units may be a higher-physical layer to lower-physical layer split or a lower-physical layer to radio frequency layer split.

According to a second aspect of the disclosure, there is provided a method of operating a second base station unit to process a first and second data package processed by a first base station unit in accordance with the method of the first aspect of the disclosure, the method comprising combining the first and second data package.

The method of the first or second aspect of the disclosure may further comprise transmitting, to either the first or second base station unit, an indicator of a decompression operation in use at the second base station unit.

According to a third aspect of the disclosure, there is provided a computer program comprising instructions which, when the program is executed by a computer, cause the computer to carry out the method of any one of the first or second aspects of the disclosure. The computer program may be stored on a computer readable carrier medium.

According to a fourth aspect of the disclosure, there is provided a first base station unit for a disaggregated base station, the first base station unit having a processor configured to carry out the method of the first aspect of the disclosure.

According to a fifth aspect of the disclosure, there is provided a second base station unit for a disaggregated base station, the second base station unit having a processor configured to carry out the method of the second aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
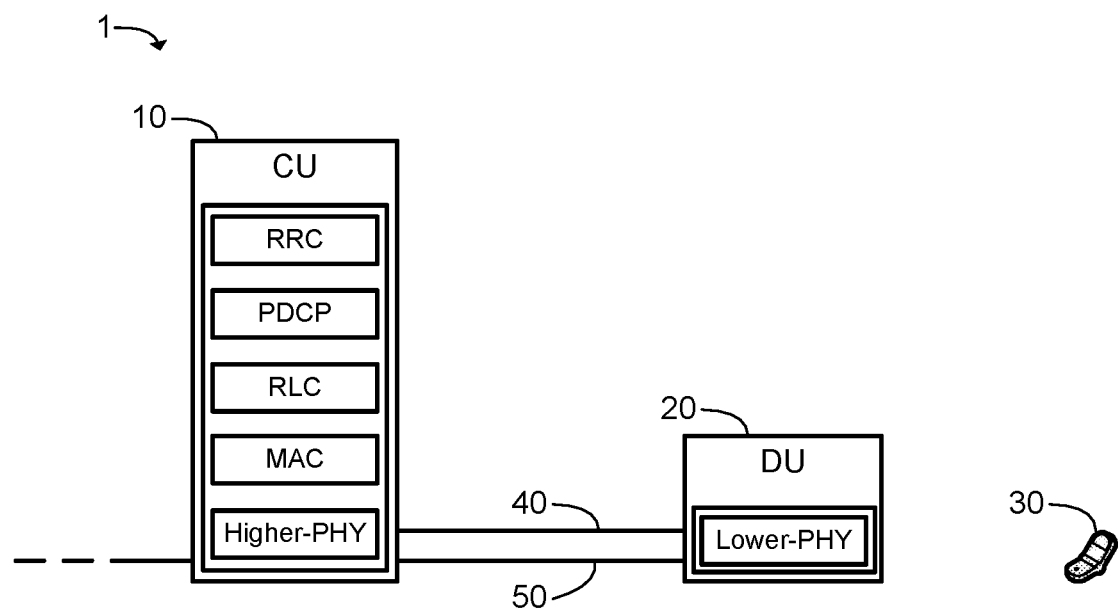
FIG. 1 is a schematic diagram of an embodiment of a centralized radio access network of the present disclosure.

A first embodiment of a cellular telecommunications network of the present disclosure will now be described with reference to FIGS. 1 to 3. FIG. 1 illustrates a disaggregated base station 1 of a Centralized Radio Access Network (C-RAN) including a Central Unit (CU) 10, a Distributed Unit (DU) 20 and a User Equipment (UE) 30. The CU 10 and DU 20 are connected by a first fronthaul link 40 and second fronthaul link 50.

Figure 2:
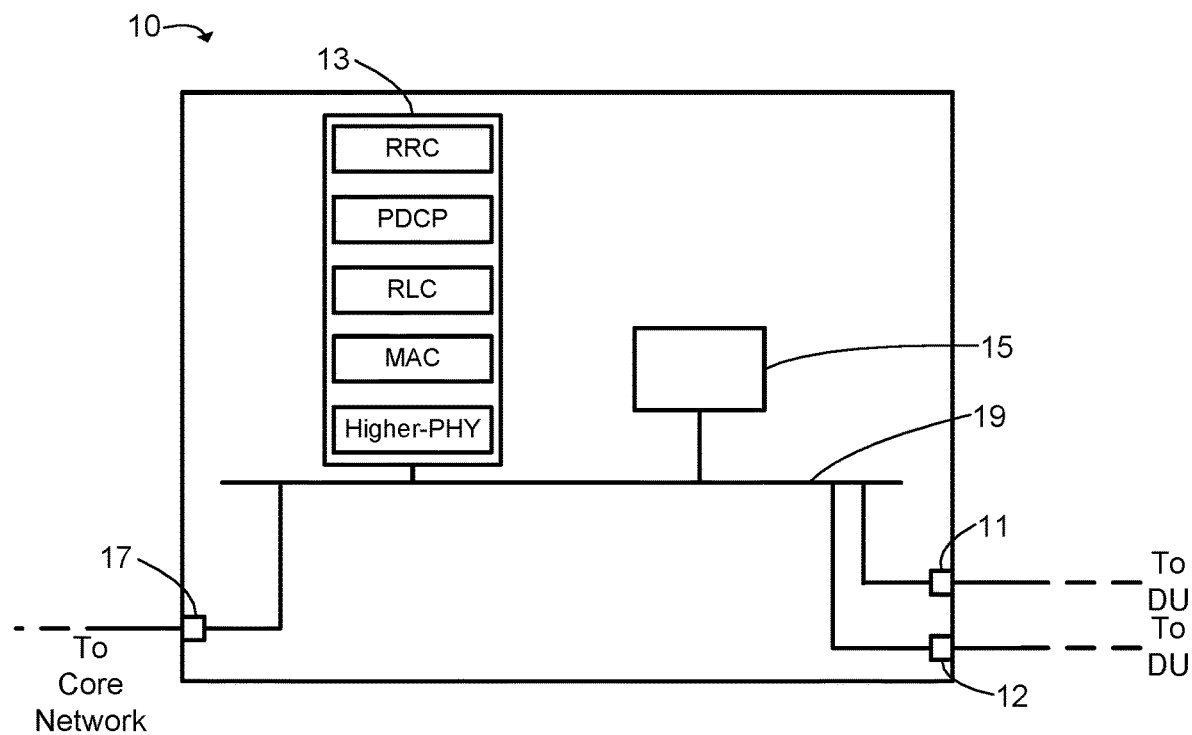
FIG. 2 is a schematic diagram of a central unit of the network of FIG. 1.

The CU 10 is shown in more detail in FIG. 2. The CU 10 includes a first communications interface 11 for connecting the CU 10 to the DU 20 via the first fronthaul link 40, a second communications interface 12 for connecting the CU 10 to the DU 20 via the second fronthaul link 50, a processor 13, memory 15, and a third communications interface 17 for connecting the CU 10 to the core network (via a backhaul link), all connected via bus 19. In this embodiment, the first and second communications interfaces 11, 12 are optical fiber interfaces for connecting the CU 10 to optical fiber fronthaul links, and the third communications interface 17 is also an optical fiber interface for connecting the CU 10 to an optical fiber backhaul link. However, the skilled person will understand that other forms of backhaul and fronthaul links are possible, such as another form of wired connection (e.g. xDSL) or a form of wireless connection (e.g. operating according to a cellular telecommunications protocol).

Figure 3:
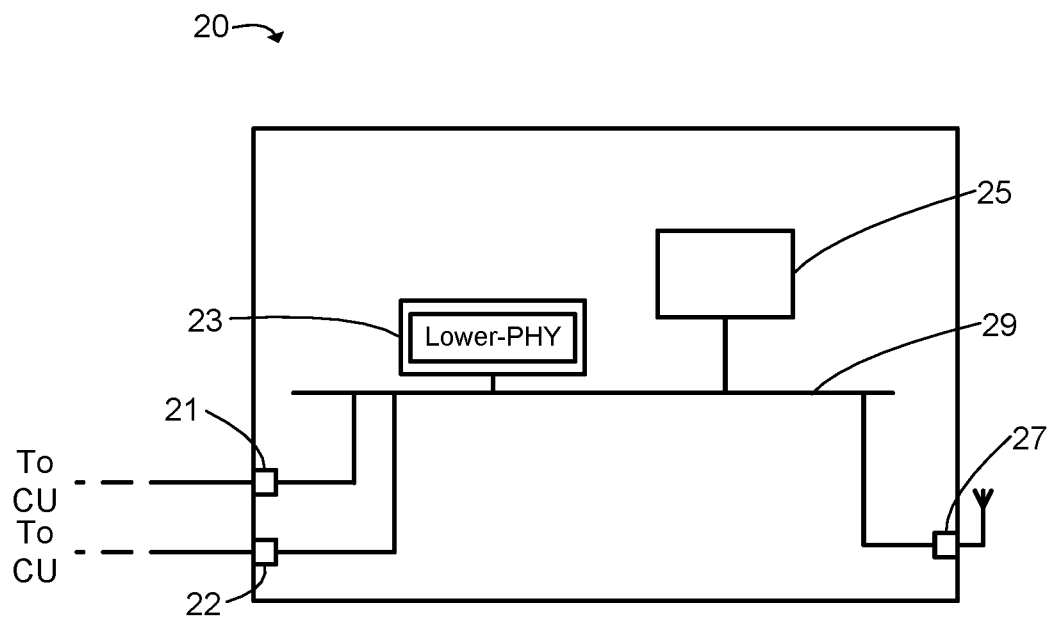
FIG. 3 is a schematic diagram of a distributed unit of the network of FIG. 1.

The DU 20 is shown in more detail in FIG. 3. The DU 20 includes a first communications interface 21 for connecting the DU 20 to the CU 10 via the first fronthaul link 40, a second communications interface 22 for connecting the DU 20 to the CU 10 via the second fronthaul link 50, a processor 23, memory 25, and a third communications interface 27 for connecting the DU 20 to the UE 30 via an access link, all connected via bus 29. In this embodiment, the third communications interface 27 is an interface to an antenna for wireless communications with the UE 30.

Turning back to FIG. 1, it is shown that the CU 10 and DU 20 perform different functions of the cellular telecommunications protocol. In this embodiment, the RF functions of the cellular telecommunications protocol are performed by an antenna (not shown in FIG. 1) connected to the third communications interface 27 of the DU 20, the DU 20 performs lower PHYsical (PHY) layer functions, whilst the CU 10 performs all higher layer functions including the higher PHY layer functions, Medium Access Control (MAC) functions, Radio Link Control (RLC) functions, Packet Data Convergence Protocol (PDCP) functions, and Radio Resource Control (RRC) functions. This is known as an intra-PHY functional split. In this arrangement, the CU 10 and DU 20 communicate using frequency-domain In-Phase and Quadrature (IQ) samples, transmitted over the fronthaul link 40. The number of bits used in each IQ sample may vary and is known as the "bit width". These IQ sample bit widths range from 6 to 16 bits (inclusive). These different IQ sample bit widths are achievable using different compression techniques, such as those defined in Annex A of ORAN Fronthaul Working Group Technical Specification "Control, User and Synchronization Plane Specification" v02.00). The respective processors 13, 23 of the CU 10 and DU 20 are able to implement one or more of these compression techniques.

A performance of a receiver or transmitter may be defined by its Error Vector Magnitude (EVM). Each IQ sample in an IQ data stream may be processed in a manner that introduces an error between the original IQ sample and the signal representative of the original IQ sample (e.g. through quantization). This may be measured as an error vector. The average amplitude of the error vector for a plurality of IQ samples in an IQ data stream, normalized to the peak signal amplitude, is the EVM. The respective processors 13, 23 of the CU 10 and DU 20 are configured to calculate the error vector for each IQ sample they transmit and to further calculate the EVM.

The following description relates to the transmitter EVM. However, it is noted that the receiver EVM is also measurable and contributes to a reduction in Signal-to-Interference-and-Noise-Ratio (SINR). That is, the effect of bit width for uplink traffic can also be considered as a quantization effect, where reduced bit width can degrade the effective SINR of the received signal.

Figure 4:
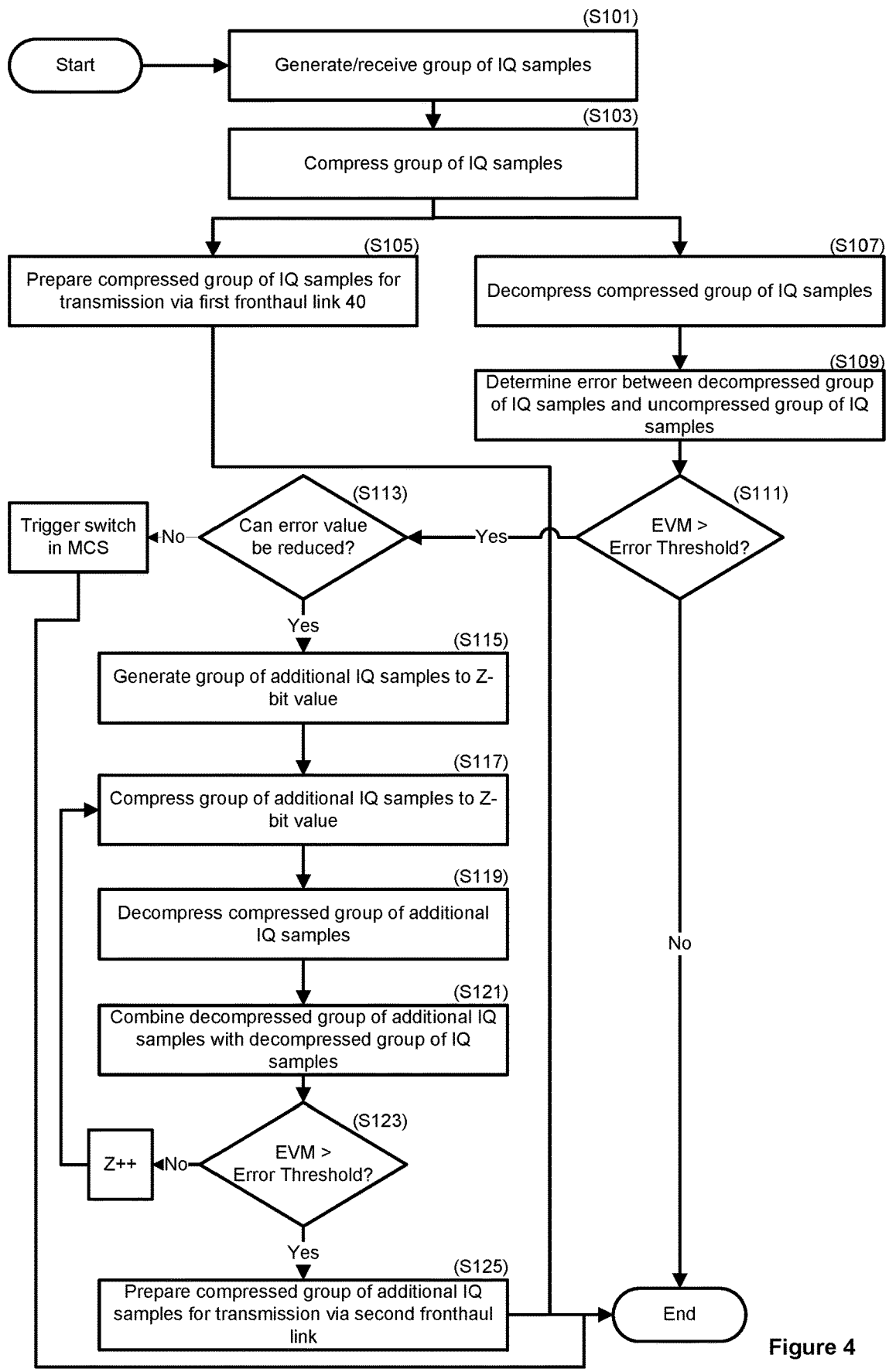
FIG. 4 is a flow diagram illustrating an embodiment of a method of the present disclosure implemented by a transmitting node.

A first embodiment of a method of the present disclosure will now be described with reference to FIGS. 4 to 6, which relates to a downlink flow of data from the CU 10 to the DU 20 so that the CU 10 receives an IP data packet from a core network (not shown), and processes that IP data packet (that is, via the functions of the RRC, PDCP, RLC, MAC and Higher-PHY layers) to generate frequency-domain IQ data. Accordingly, in S101 as illustrated in the flow diagram of FIG. 4, the CU 10 generates a group of 12 IQ samples for transmission to the DU 20. This group of IQ samples are hereinafter referred to as the group of "original" IQ samples. This group of original IQ samples are uncompressed and include a 24-bit I value and 24-bit Q value. The total size of the uncompressed group of original IQ samples is therefore 576-bits (2*24*12).

In S103, the CU 10 processes the uncompressed group of original IQ samples according to a particular Modulation and Coding Scheme (MCS) and by using a particular compression technique. In this embodiment, the compression technique compresses each I and Q value to a 10-bit value. The CU 10 also generates an exponent value, being a 4-bit value, for the compressed group of original IQ samples. The total size of the compressed group of original IQ samples is therefore 244-bits ((2*12*10)+4). Transmission of the compressed group of original IQ samples, instead of the uncompressed group of original IQ samples, to the DU 20 will therefore require less bandwidth, which in turn means that greater data throughput may be achieved between the CU 10 and DU 20.

In S105, the CU 10 prepares the compressed group of original IQ samples for transmission over the first fronthaul link 40. Additionally, the CU 10 determines whether additional data should be transmitted to the DU 20 in order to improve the accuracy of the IQ data at the DU 20. To achieve this, in S107, and in parallel to step 105, the CU 10 initially determines whether the compressed group of original IQ samples satisfy an accuracy threshold by decompressing the compressed group of original IQ samples using the decompression technique to be used by the DU 20. In a deployment in which the CU 10 determines the decompression technique to be used by the DU 10 (e.g. based on the compression technique being used in S103), the CU 10 may add an identifier for the decompression technique to be used by the DU 20 to the packet header or to a control message. Alternatively, in a deployment in which the DU 20 determines its own decompression technique, a control message may be sent from the DU 20 to the CU 10 to inform the CU 10 of the decompression technique being used (or its logic to determine what decompression technique will be used for a given set of criteria). In a further example, a management system may determine a suitable compression and decompression technique and communicate this to both the CU 10 and DU 20.

In S109, the CU 10 compares the decompressed group of original IQ samples with the uncompressed group of original IQ samples. Each IQ sample of the uncompressed group of original IQ samples represents a specific constellation point (as shown in the constellation diagram of FIG. 5). Although FIG. 5 shows an exact mapping between the IQ sample of the uncompressed group of original IQ samples and the constellation point, there may be a small difference due to modifications prior to transmission (e.g. modifications of the amplitude and/or phase due to precoding). Nonetheless, due to the lossy compression technique used in S103, an error exists between each IQ sample of the decompressed group of original IQ samples and the corresponding IQ sample of the uncompressed group of original IQ samples. This error is represented by an error vector. The average amplitude of the error vector for each IQ sample in the decompressed group of original IQ samples is evaluated to compute an EVM value.

Returning to FIG. 4, in S111, the CU 10 compares the computed EVM value to an error threshold. This error threshold may be based on the maximum EVM requirement for the relevant MCS, with an additional restriction (e.g. 5%, 10%, 15%, etc.) to accommodate any further impairments that may occur during transmission. If the computed EVM value is below the error threshold, then the sub-process ends so that only the compressed group of original IQ samples is transmitted over the first fronthaul link 40 (as noted in S105 above). In this embodiment, the computed EVM value exceeds the error threshold and so, in S113, the CU 10 determines whether the error value can be reduced. An example process for this determination is explained below following the discussion of S115 to S125.

If the determination of S113 is negative so that the error value cannot be reduced, then the CU 10 responds by triggering a switch to an MCS with a greater EVM requirement so that future groups of IQ samples are processed at this new MCS. This has the benefit that the switch will occur more quickly than typical link adaptation processes as the switch is triggered based on monitoring a single group of IQ samples (compared to existing link adaptation techniques which monitor traffic for a much longer period of time). For the current group of IQ samples, only the compressed group of original IQ samples are transmitted in S105 and the process ends.

Figure 5:
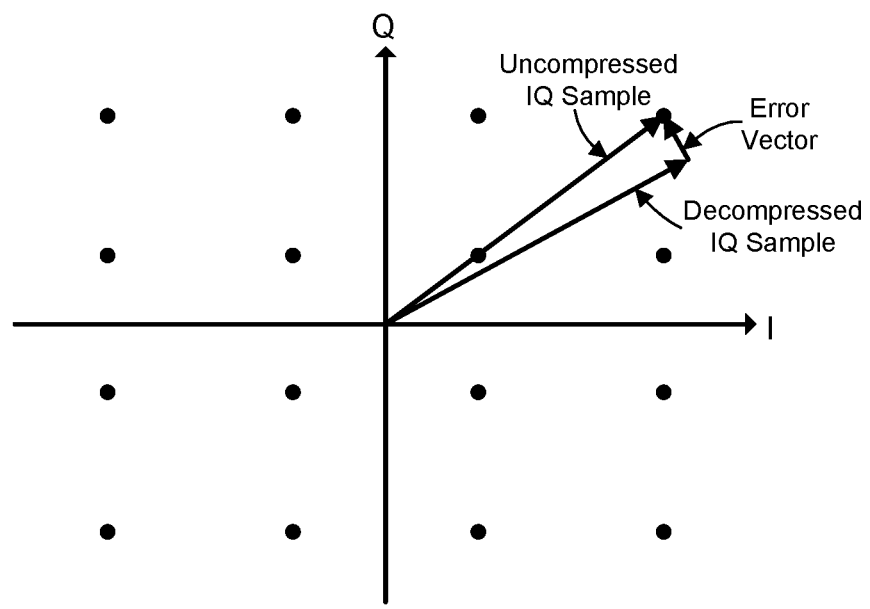
FIG. 5 is an example constellation diagram.

In this embodiment, the CU 10 determines that the error value can be reduced and so, in S115, generates a group of additional IQ samples in which each IQ sample of the group of additional IQ samples is representative of the error vector (as shown in FIG. 5) between an IQ sample of the decompressed group of original IQ samples and the corresponding IQ sample of the uncompressed group of original IQ samples. In this example, each IQ sample of the group of additional IQ samples is a 24-bit value.

In S117, each IQ sample of the group of additional IQ samples is compressed (using any suitable compression technique) to a Z-bit value. In this example, Z is initially set to 6. In S119, the CU 10 decompresses each Z-bit IQ sample of the compressed group of additional IQ samples (in the same manner as S107 above) and, in S121, creates a group of combined IQ samples by combining each IQ sample of the decompressed group of additional IQ samples with the corresponding IQ sample of the decompressed group of original IQ samples. In S123, the CU 10 determines a new error vector between each IQ sample of the group of combined IQ samples and its corresponding IQ sample of the uncompressed group of original IQ samples, computes a new EVM for these new error vectors, and compares this new EVM with the error threshold (used in S111). If the new EVM is below the error threshold, then the value of Z is accepted and the process proceeds to S125. If the new EVM exceeds the error threshold, then the process loops back to S117 and the group of additional IQ samples are compressed again with a new (greater) value of Z. The value of Z may increase by 1-bit in each iteration until a suitable value is found.

In S125, the CU 10 prepares the compressed group of additional IQ samples for transmission to the DU 20 via the second fronthaul link 50. The CU 10 may then process a new group of IQ samples by looping back to S101.

Returning to S113 in which the CU 10 determines whether the error value can be reduced, the CU 10 achieves this determination (in this embodiment) by performing S115 to S123 for the largest possible value of Z. If the EVM exceeds the error threshold for the largest possible value of Z, then the determination is negative. If the EVM is below the error threshold, then the process continues to S115 to S123 as described above to determine the lowest possible value of Z in which the EVM is below the error threshold.

Figure 6:
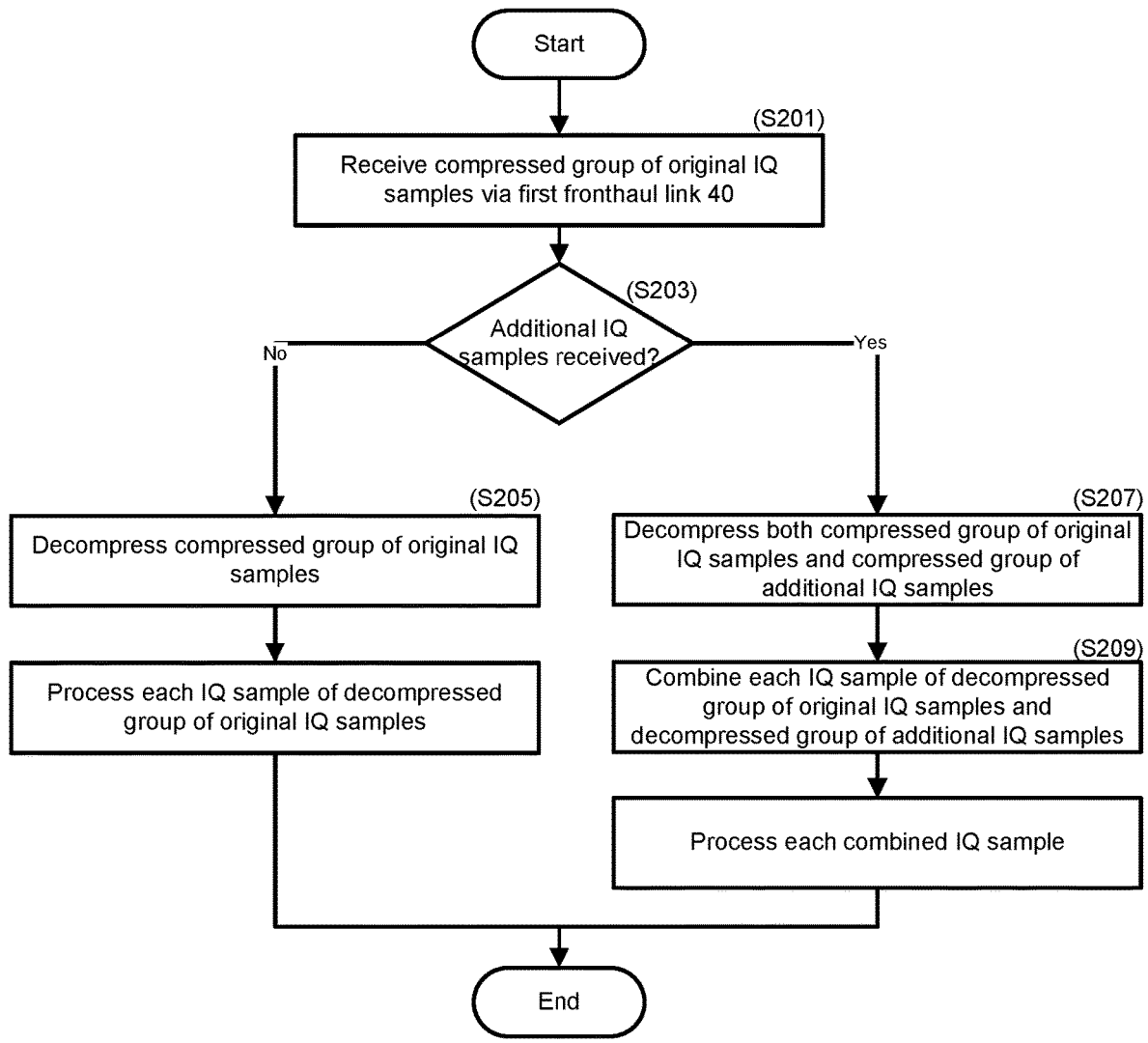
FIG. 6 is a flow diagram illustrating an embodiment of a method of the present disclosure implemented by a receiving node.

The DU 20 implements a process illustrated in FIG. 6. In S201, the DU 20 receives the compressed group of original IQ samples via the first fronthaul link 40 and stores them in a buffer awaiting onward transmission. In S203, the DU 20 determines whether or not a compressed group of additional IQ samples are received at the second fronthaul link 50 whilst the compressed group of original IQ samples are stored in the DU's buffer. The DU 20 determines that the compressed group of additional IQ samples correspond to the compressed group of original IQ samples (that is, the compressed group of additional IQ samples represent the error vectors for that compressed group of original IQ samples) as their respective packet headers both include the same frame identifier, same slot identifier, same starting Physical Resource Block (PRB) identifier and the same number of PRBs. If the DU 20 does not receive the corresponding compressed group of additional IQ samples via the second fronthaul link 50 by the time the compressed group of original IQ samples are dequeued from the buffer, then the process proceeds to S205 in which the DU 20 performs a decompression operation on the compressed group of original IQ samples received via the first fronthaul link 40 and the decompressed group of original IQ samples is further processed by the DU 20. If the DU 20 receives the compressed group of additional IQ samples via the second fronthaul link 40, then the process proceeds to S207.

In S207, the DU 20 performs a decompression operation on both the compressed group of original IQ samples and the compressed group of additional IQ samples. In S209, each IQ sample of the decompressed group of original IQ samples is combined with the corresponding IQ sample of the decompressed group of additional IQ samples to create a group of combined IQ samples, which is then further processed by the DU 20.

The above embodiment provides the technical advantage that the EVM for an IQ data stream is kept below the error threshold so that the IQ data may be successfully decompressed and decoded by the receiver. The above embodiment therefore mitigates against having to switch to a more robust MCS having a greater EVM requirement (increasing the capacity requirement for the entire radio link for a given IQ data stream as more radio resources would be required to maintain same data rate) or to a compression technique with a greater bit width (increasing the capacity requirement for the fronthaul for a given IQ data stream). However, in the above embodiment, each group of original IQ samples is evaluated to predict whether the EVM at the receiver is within an error threshold and, if the EVM exceeds the error threshold, a group of additional IQ samples is sent. By combining the original IQ samples with the additional IQ samples, the EVM at the receiver is reduced below the error threshold. Accordingly, the transmitter may maintain the same MCS and compression technique which would otherwise (without the additional IQ samples) exceed the error threshold.

A further advantage of the above embodiment may be realized by utilizing an MCS and/or compression technique that would otherwise exceed the error threshold. That is, the CU 10 may use an MCS and/or compression technique to prepare a compressed group of original IQ samples which have an EVM that exceeds the error threshold but have other, more favorable, transmission characteristics (e.g. lower latency due to a lower processing time associated with the MCS/compression technique), and then utilize the group of additional IQ samples in order to reduce the EVM to below the error threshold. Accordingly, the above embodiment enables the transmitter to use an MCS and/or compression technique with favorable transmission characteristics that could not otherwise be used (that is, without the additional IQ samples). The above embodiment therefore improves the radio performance for an IQ data stream compared to the prior art methods.

In the above embodiment, the disaggregated base station is divided into two base station units—the CU 10 and DU 20. However, the skilled person will understand that the base station may be divided into any number of base station units. This includes a three unit example in which the base station is divided into a CU, DU and Radio Unit (RU), and communications between the DU and RU utilize IQ data. This also includes a four unit example in which the base station is divided into a CU, DU, FrontHaul GateWay (FHGW) and RU, and communications between the DU and RU (via the FHGW) utilize IQ data. Furthermore, the skilled person will understand that the CU may connect to a plurality of DUs, the (or each) DU may connect to a plurality of RUs, the (or each) DU may connect to a plurality of FHGWs, and the (or each) FHGW may connect to a plurality of RUs.

The skilled person will also understand that it is non-essential that the IQ data communicated between these base station units is frequency-domain IQ data. This is used, in the above embodiment, as the CU and DU utilize an intra-PHY layer split. However, the base station units may utilize a PHY/RF layer split, in which case time-domain IQ data would be communicated between relevant base station units (e.g. between the CU and DU or between the DU and RU). Where one base station unit is connected to a plurality of other base station units (e.g. a CU is connected to multiple DUs), then communications between the base station unit and each of the plurality of other base station units may utilize either functional split and therefore either frequency-domain or time-domain IQ data. In a four unit example in which communications between the DU and a plurality of RUs are via one or more FHGWs, the FHGW(s) may convert between frequency-domain and time-domain IQ data so that the FHGW can communicate with the DU using frequency-domain IQ data but each RU can communicate with the FHGW using either frequency-domain or time-domain IQ data. In these scenarios where the multiple IQ data flows are being communicated, it is likely for the processing of these flows to be sub-optimal so that the EVM increases above the relevant threshold, in which case the above embodiment may be used to reduce these errors and maximize the data throughput of the fronthaul link(s).

In the above embodiment, the first and second fronthaul link 40, 50 are distinct physical connections. However, this is non-essential as they may be logically distinct fronthaul links provided on a common physical connection, for example when the CU 10 and DU 20 are operated by several network operators in a neutral hosting arrangement. In this arrangement, each operator may utilize dedicated resources on the physical connection as a first fronthaul link and further utilize shared resources on the physical connection as a second fronthaul link. The first and/or second fronthaul link 40, 50 may also be shared (in part or in full) between several base station units that are connected to a common base station unit (e.g. several RUs connected to the same DU, or several DUs connected to the same CU). Furthermore, traffic between a base station unit and a plurality of other base station units may be prioritized so that IQ data flows between a first pair of base station units is transmitted in preference to IQ data flows between a second pair of base station units.

Furthermore, in the above embodiment, the CU 10 and DU 20 are connected via first and second fronthaul links (either physically or logically). This provides the benefit that the first fronthaul link may be utilized up to its maximum (or near maximum) capacity for transmitting groups of original IQ samples, and then the second fronthaul link may be utilized for transmitting groups of additional IQ samples when required. However, this is non-essential. The CU 10 and DU 20 may be connected by a single fronthaul link (so both the group of original IQ samples and group of additional IQ samples are transmitted over the same fronthaul link) and realize the benefits of reduced bandwidth requirements and increased data throughput (by maintaining the same MCS and compression technique for an IQ data stream despite one or more groups of original IQ samples exceeding an error threshold) by transmitting the group of additional IQ samples for each group of original IQ samples that exceed the error threshold. In this scenario, the group of original IQ samples may be transmitted at a particular proportion of the total capacity of the fronthaul link (e.g. 80%, 90%, 95%) to provide bandwidth for a group of additional IQ samples.

Figure 7:
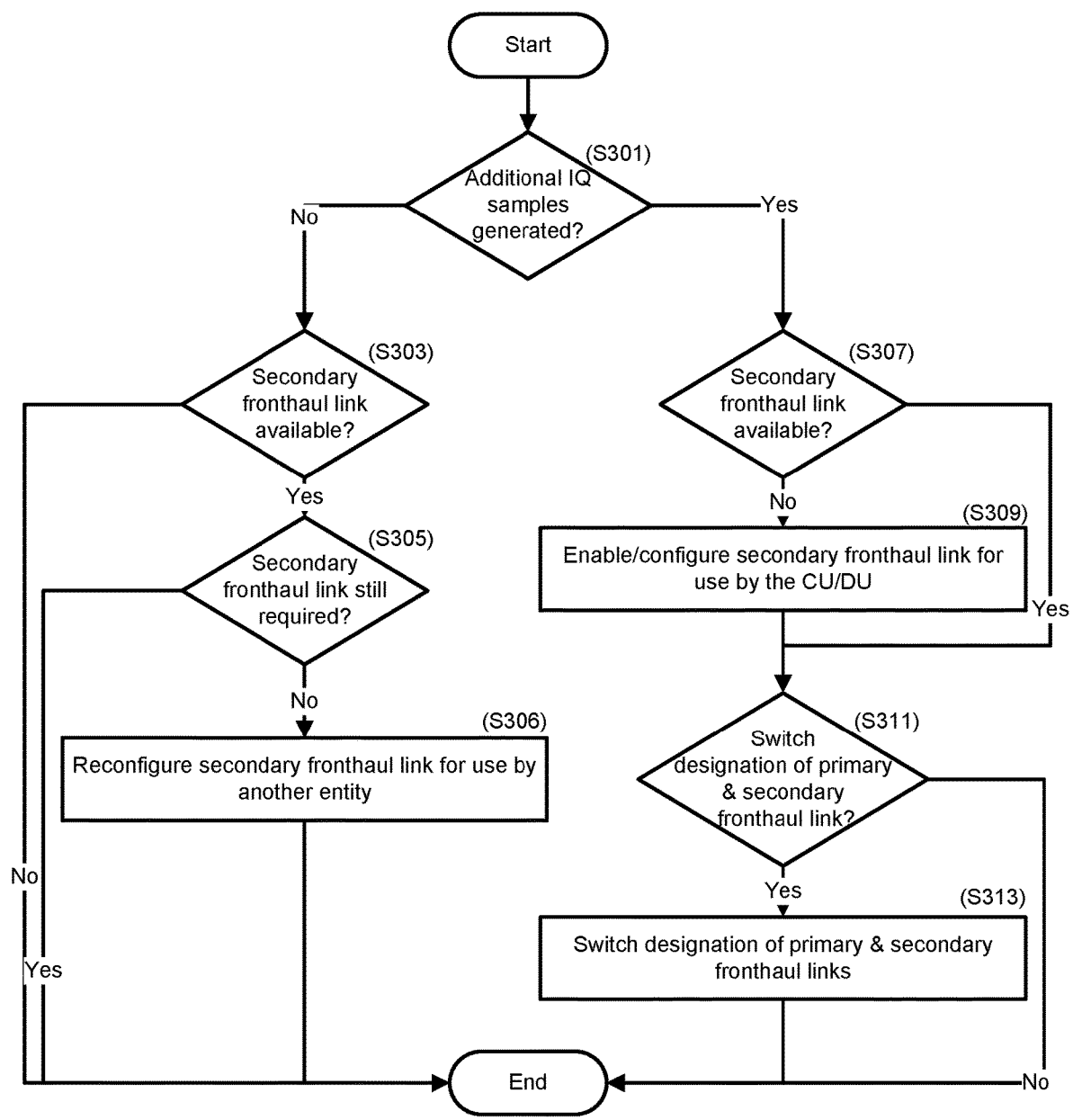
FIG. 7 is a flow diagram of a process implemented by the transmitting node in an enhancement to the embodiment of the method of FIG. 4.

In an enhancement to the above embodiment, the CU 10 may implement an additional process of monitoring the first and second fronthaul links 40, 50. This will now be described with reference to FIG. 7. Initially, the first fronthaul link 40 is being used for transmitting a group of original IQ samples (and is therefore the "primary" fronthaul link) and the second fronthaul link 50 is being used for transmitting a group of additional IQ samples (and is therefore the "secondary" fronthaul link).

In S301, the CU 10 performs a monitoring operation to determine if a group of additional IQ samples is being generated. If so, then the process proceeds to S307, described below. If not, then the CU 10 determines (S303) whether the second fronthaul link 50 is currently available (that is, configured for use in communications between the CU 10 and DU 20). If the second fronthaul link 50 is not currently available, then the process ends for this monitoring period. If it is currently available, then in S305 the CU 10 determines whether the second fronthaul link 50 is still required (for any future data flow between the CU 10 and DU 20, between any other CU/DU that also utilizes the same second fronthaul link 50, or any other traffic not associated with the disaggregated base station 1). If the second fronthaul link 50 is not still required, then (in S306) the CU 10 either disables the second fronthaul link 50 or initiates a reconfiguration of the second fronthaul link 50 so that it may be used (exclusively or otherwise) by another entity (e.g. resources of a shared physical connection may be logically reassigned to another entity). If the CU 10 determines that the second fronthaul link 50 is still required, then the process end for this monitoring period.

Returning to S301, the CU 10 may determine that the second fronthaul link 50 is required and so the process proceeds to S307 in which the CU 10 determines whether the second fronthaul link is currently available. If not, in S309, then the second fronthaul link 50 is enabled and configured for communications between the CU 10 and DU 20. Following either S307 or S309, the CU 10 determines whether the current designation of primary and secondary fronthaul links should be switched (S311). This determination may be based on a comparison of one or more of the following metrics: capacity, latency, jitter, reliability, interference, and throughput. The determination may also be based on a weighted combination of these metrics, and may also be tailored to the service being provided so that the metrics and/or weightings are adapted according to the priorities of the service. If this determination is positive, then (in S313) the designation of primary/secondary fronthaul links is switched so that the second fronthaul link 50 becomes the primary fronthaul link and is therefore used for transmission of the compressed group of original IQ samples, and the first fronthaul link 40 becomes the secondary fronthaul link and is therefore used for transmission of the compressed group of additional IQ samples. This switch may either occur once all IQ data in the CU's buffer has been transmitted, or instead the compressed group of original IQ samples may be re-processed so as to use an appropriate MCS and compression technique for the secondary fronthaul link 50 (this may also be performed for any other groups of original IQ samples in the CU's buffer that may be re-processed without exceeding a relevant transmission window), and so that any compressed group of additional IQ samples relating to groups of original IQ samples that have already been processed by the CU 10 and are ready for transmission are re-processed according to S117 to S125 of the above embodiment.

If the determination at S311 is negative, then the designation of primary and secondary links are maintained.

The skilled person will understand that it is non-essential that the IQ samples are processed in groups of 12. That is, a single IQ sample or any size group of IQ samples may be processed in the manner described above.

In the above embodiment, a sub-process is used to determine the value of Z (the number of bits for each IQ sample in the compressed group of additional IQ samples) in which the value of Z is increased from a minimum value until the EVM is greater than the error threshold. The value of Z may be increased by 1-bit in every iteration, or by another incremental value (thus balancing accuracy with any latency introduced by the sub-process). Furthermore, this sub-process is non-essential and instead the value of Z may be fixed, adjusted based on radio performance feedback, or based on the available bandwidth of the secondary fronthaul link.

In the above embodiment, it is determined whether an increase in bit width will reduce the error value by evaluating S115 to S123 for the maximum value of Z. However, this is also non-essential. Alternatively, this may be based on known hardware limitations of the device (e.g. based on a calibration phase) or by evaluating, for example, the Effective Number of Bits (ENOB).

The skilled person will also understand that the above embodiment may be implemented for both downlink (CU to DU) and uplink (DU to CU) traffic.

In the above embodiment, each IQ sample of the group of additional IQ samples represents an error vector between an IQ sample of the decompressed group of original IQ samples and a corresponding IQ sample of the uncompressed group of original IQ samples. However, this is non-essential. In another implementation, each IQ sample of the compressed group of original IQ samples may represent the most significant bits of the original IQ sample and each IQ sample of the compressed group of additional IQ samples may represent some or all of the next most significant bits of the original IQ sample. The additional IQ samples may also include a new way to scale the combined value.

The skilled person will understand that any combination of features is possible within the scope of the invention, as claimed.

The invention claimed is:

1. A method of operating a first base station unit to process In-Phase and Quadrature (IQ) data for transmission to a second base station unit, the first base station unit and the second base station unit both being part of a disaggregated base station in a cellular telecommunications network, the method comprising:
    preparing a first data package, based on IQ data, for transmission to the second base station unit;
    determining a first error value between the IQ data and the first data package;
    causing transmission of the first data package to the second base station unit;
    determining that the first error value exceeds a first error threshold; and
    in response to the determination that the first error value exceeds the first error threshold:
    preparing a second data package, based on the IQ data, for transmission to the second base station unit, wherein a second error value between the IQ data and a combination of the first data package and the second data package is less than the first error value, and
    causing transmission of the second data package to the second base station unit.

2. The method as claimed in claim 1, wherein the first base station unit and the second base station unit are connectable by a first communications link and a second communications link, the causing transmission of the first data package is over the first communications link and the causing transmission of the second data package is over the second communications link.

3. The method as claimed in claim 2, wherein the first communications link and the second communications link are based on separate connections between the first base station unit and the second base station unit.

4. The method as claimed in claim 2, wherein the first communications link and the second communications link are logical and are based on the same connection between the first base station unit and the second base station unit.

5. The method as claimed in claim 4, wherein a set of resources of the first communications link or the second communications link is shared between a plurality of network operators.

6. The method as claimed in claim 2, further comprising determining whether the first communications link or the second communications link should be used for transmission of the first data package.

7. The method as claimed in claim 6, wherein the determination of whether the first communications link or the second communications link should be used for transmission of the first data package is based on a comparison of one or more performance metrics for the first communications link and the second communications links.

8. The method as claimed in claim 1, wherein the first data package and the second data package are compressed.

9. The method as claimed in claim 8, further comprising determining a compression ratio for the second data package so that the second error value is less than a second error threshold.

10. The method as claimed in claim 1, wherein the disaggregated base station includes one of:
- at least one central base station unit and at least one distributed base station unit, wherein the first base station unit is either one of the at least one central base station unit or one of the at least one distributed base station unit;
- at least one central base station unit, at least one distributed base station unit, and at least one radio base station unit, wherein the first base station unit is either one of the at least one distributed base station unit or one of the at least one radio base station unit; or
- at least one central base station unit, at least one distributed base station unit, at least one FrontHaul GateWay (FHGW) and at least one radio base station unit, wherein the first base station unit is either one of the at least one distributed base station unit or one of the at least one radio base station unit.

11. The method as claimed in claim 1, wherein a cellular telecommunications protocol split between the first base station unit and the second base station unit is a higher-physical layer to lower-physical layer split or a lower-physical layer to radio frequency layer split.

12. A method of operating a second base station unit to process a first data package and a second data package processed by a first base station unit, the first base station unit and the second base station unit both being part of a disaggregated base station in a cellular telecommunications network, the method comprising:
- receiving transmission of the first data package from the first base station unit, wherein the first station unit prepared the first data package, based on IQ data, for transmission to the second base station unit and determined a first error value between the IQ data and the first data package;
- receiving transmission of the second data package from the first base station unit; wherein the first base station unit determined that the first error value exceeds a first error threshold and, in response to the determination that the first error value exceeds the first error threshold, prepared the second data package, based on the IQ data, for transmission to the second base station unit, wherein a second error value between the IQ data and a combination of the first data package and the second data package is less than the first error value; and
- combining the first data package and the second data package.

13. The method as claimed in claim 1, further comprising transmitting, to either the first base station unit or the second base station unit, an indicator of a decompression operation in use at the second base station unit.

14. A non-transitory computer-readable storage medium storing a computer program comprising instructions which, when the computer program is executed by a computer, cause the computer to carry out a method of operating a first base station unit to process In-Phase and Quadrature (IQ) data for transmission to a second base station unit, the first base station unit and the second base station unit both being part of a disaggregated base station in a cellular telecommunications network, the method comprising:
- preparing a first data package, based on IQ data, for transmission to the second base station unit;
- determining a first error value between the IQ data and the first data package;
- causing transmission of the first data package to the second base station unit;
- determining that the first error value exceeds a first error threshold; and
- in response to the determination that the first error value exceeds the first error threshold:
  - preparing a second data package, based on the IQ data, for transmission to the second base station unit, wherein a second error value between the IQ data and a combination of the first data package and the second data package is less than the first error value, and
  - causing transmission of the second data package to the second base station unit.

15. A first base station unit for a disaggregated base station, the first base station unit comprising a processor configured to carry out a method of operating a first base station unit to process In-Phase and Quadrature (IQ) data for transmission to a second base station unit, the first base station unit and the second base station unit both being Part of a disaggregated base station in a cellular telecommunications network, the method comprising:
- preparing a first data package, based on IQ data, for transmission to the second base station unit;
- determining a first error value between the IQ data and the first data package;
- causing transmission of the first data package to the second base station unit;
- determining that the first error value exceeds a first error threshold; and
- in response to the determination that the first error value exceeds the first error threshold:
  - preparing a second data package, based on the IQ data, for transmission to the second base station unit, wherein a second error value between the IQ data and a combination of the first data package and the second data package is less than the first error value, and
  - causing transmission of the second data package to the second base station unit.

16. A second base station unit for a disaggregated base station, the second base station unit comprising a processor configured to carry out a method of operating the second base station unit to process a first data package and a second data package processed by a first base station unit, the first base station unit and the second base station unit both being part of a disaggregated base station in a cellular telecommunications network, the method comprising:
- receiving transmission of the first data package from the first base station unit, wherein the first station unit prepared the first data package, based on IQ data, for transmission to the second base station unit and determined a first error value between the IQ data and the first data package;
- receiving transmission of the second data package from the first base station unit; wherein the first base station unit determined that the first error value exceeds a first error threshold and, in response to the determination that the first error value exceeds the first error threshold, prepared the second data package, based on the IQ data, for transmission to the second base station unit, wherein a second error value between the IQ data and a combination of the first data package and the second data package is less than the first error value; and combining the first data package and the second data package.

* * * * *